United States Patent [19]

Jean-Jacques

[11] Patent Number: 5,082,028

[45] Date of Patent: Jan. 21, 1992

[54] POOL CLEANER SUCTION PIPE

[76] Inventor: Leonard Jean-Jacques, 401 Loerie Avenue, Douglasdale Ext. 21, Sandton, Transvaal, South Africa

[21] Appl. No.: 400,541

[22] Filed: Aug. 30, 1989

[30] Foreign Application Priority Data

Aug. 30, 1988 [ZA] South Africa .................. 88/6432

[51] Int. Cl.⁵ .............................................. F16L 9/12
[52] U.S. Cl. .................................... 138/118; 138/103; 138/106; 138/120; 138/178; 138/DIG. 8; 15/1.7; 4/490
[58] Field of Search ............... 138/103, 106, 107, 118, 138/121, 122, 178, DIG. 8, 120, 155; 15/1.7, 257 A; 4/490; 134/14, 21, 22.1, 22.11

[56] References Cited

U.S. PATENT DOCUMENTS

| | | | |
|---|---|---|---|
| 2,146,763 | 2/1939 | Replogle | 15/1.7 |
| 2,998,028 | 8/1961 | Rohde | 138/118 |
| 3,179,442 | 4/1965 | Lofgren | 138/DIG. 8 |
| 3,321,787 | 5/1967 | Myers | 15/1.7 |
| 3,826,288 | 7/1974 | Cooper et al. | 138/118 |
| 4,100,641 | 7/1978 | Pansini | 15/1.7 |
| 4,683,599 | 8/1987 | Rief | 4/490 |
| 4,791,963 | 12/1988 | Gronert et al. | 138/106 |
| 4,797,206 | 1/1989 | Lynch | 15/1.7 |
| 4,839,063 | 6/1989 | Brooks | 15/1.7 |

Primary Examiner—James E. Bryant, III
Attorney, Agent, or Firm—Cushman, Darby & Cushman

[57] ABSTRACT

A suction pipe for a suction-type submerged pool cleaner has a spigot at one end for connection to the pool cleaner and a spigot at the other end for connection to a suction source. Part of the suction pipe extending from the suction head is formed into a substantially helical-like shape.

3 Claims, 4 Drawing Sheets

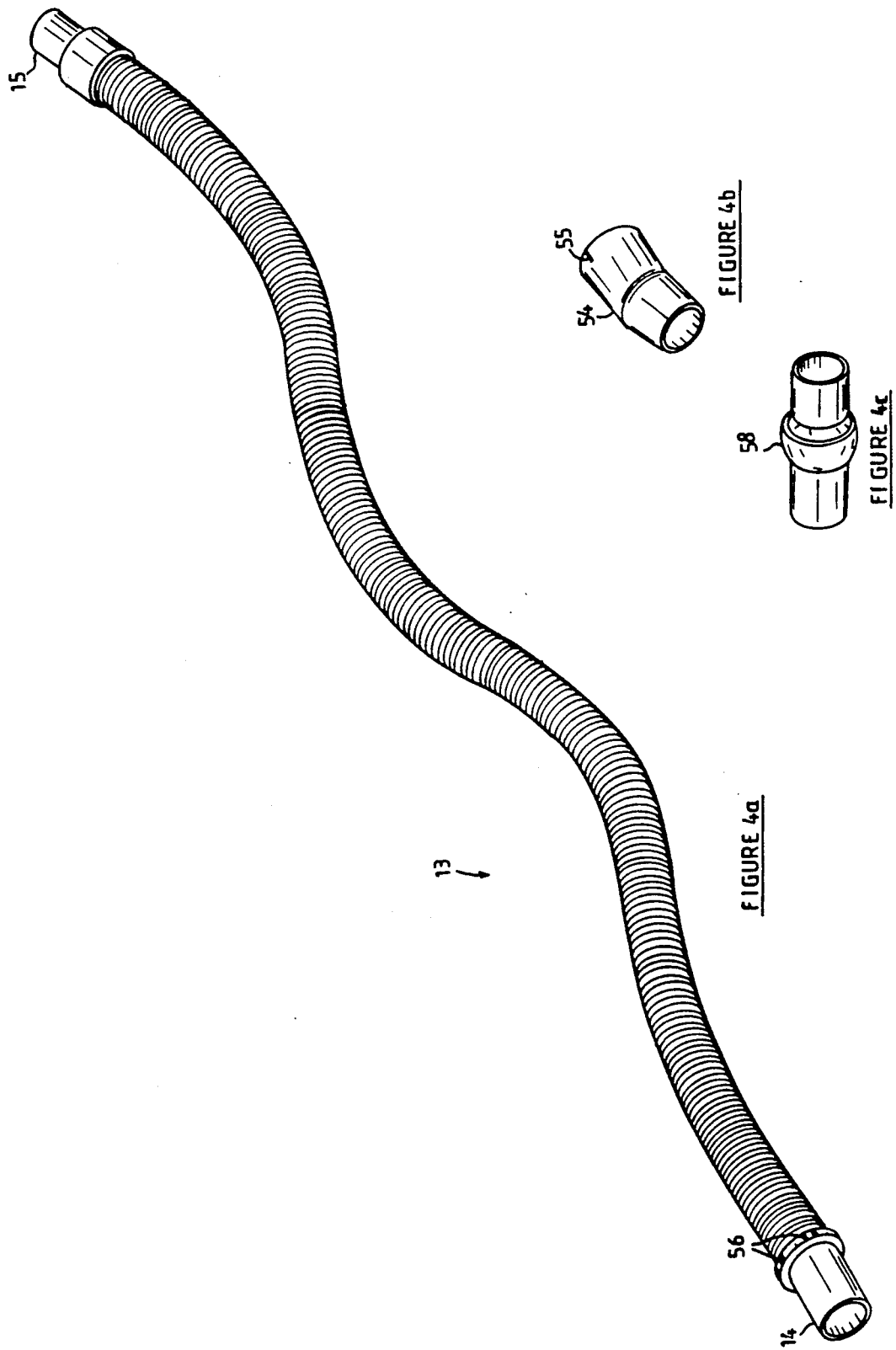

5,082,028

POOL CLEANER SUCTION PIPE

FIELD OF THE INVENTION

This invention relates to submerged pool cleaners. More particularly, this invention relates to the suction pipe of a suction-type submerged pool cleaner.

BACKGROUND TO THE INVENTION

There are available today suction-type submerged pool cleaners for swimming pools which comprise a suction head and a suction pipe connecting the suction head to a suction source.

A common disadvantage of this type of pool cleaner is that the suction head may repeatedly become lodged at a particular location in the pool. In this regard, it is not uncommon for the suction head to become lodged in a corner of the pool where the corners are not sufficiently rounded or on the steps which lead into the pool.

Another disadvantage of the above type of pool cleaner is the inability of the suction head consistently and randomly to sweep the entire submerged area of the pool. For example, certain areas of the submerged surface are often missed or alternatively, it takes the suction head an inordinately long time to reach and sweep those areas.

It is accordingly an object of the present invention to overcome or at least minimize the above disadvantages.

SUMMARY OF THE INVENTION

According to one aspect of the invention, there is provided a suction pipe for a suction-type submerged pool cleaner, the suction pipe having means at one end for connection to the pool cleaner and means at the other end for connection to a suction source, characterized in that a part of the suction pipe extending from the suction head is formed into a substantially helical-like shape.

Preferably the suction pipe comprises a conventional section and a shapable section, the shapable section extending from the pool cleaner and including means for shaping it into a substantially helical-like shape.

The shapable section of the suction pipe preferably comprises a length of conventional suction pipe having a plurality of clamps attached thereto at intervals along its length, each clamp having an eyelet suitable to receive an elongate member, the clamps being rotated relative to one another so that the eyelets lie in a helical path, the elongate member being held to the length of pipe adjacent opposite ends thereof.

The elongate member may be a flexible steel rod holding the shapable section of the suction pipe in a substantially helical-like shape.

Alternatively, the elongate member may be a flexible member which is drawn taut, causing the shapable section of suction pipe to curl into a substantially helical-like shape.

Applicant has found that if the shapable section of the suction pipe is connected to the suction head, and a conventional suction pipe is connected to the shapable section and to a suction source, the suction head moves, in use, with greater randomness across the submerged area of a swimming pool than in the case where conventional suction piping connects the suction head to the suction source. Moreover, the suction head does not readily lodge in corners or on the steps of the pool, if it includes the shapable section described above.

Each clamp is attached to the shapable section may be rotated through 90° or more relative to a preceding clamp and in one configuration, four clamps are used.

The shapable section may either be shaped into a clockwise helical-like shape or an anti-clockwise helical-like shape.

The shapable section is further preferably fitted with identical fittings at each end for connection to the suction head and to the conventional section of the suction pipe.

This invention further provides a section of suction pipe for a suction-type submerged pool cleaner, the section having means at one end for connection to the pool cleaner and means at the other end for connection to a conventional suction pipe for the pool cleaner, the section of suction pipe being characterized in that it is formed into a substantially helical shape.

BRIEF DESCRIPTION OF THE DRAWINGS

Preferred embodiments of the invention will now be described in detail with reference to the accompanying drawings, in which;

FIG. 2a is a detailed perspective view of a shapable section suction pipe used in the pool cleaner of FIG. 1;

FIGS. 2b to 2d are enlarged views of fittings used with the shapable section of pipe of FIG. 2a;

FIGS. 2e to 2f are similar views of alternative fittings for use with the shapable section of pipe of FIG. 2a;

FIG. 4a is a similar view of a further alternative form of a section of pipe for use in accordance with the invention; and FIGS. 4b and 4c are simmilar views of further fittings which can be used with the invention.

In the drawings, like parts are given like numbers for ease of reference.

DESCRIPTION OF PREFERRED EMBODIMENTS

Figure 1:
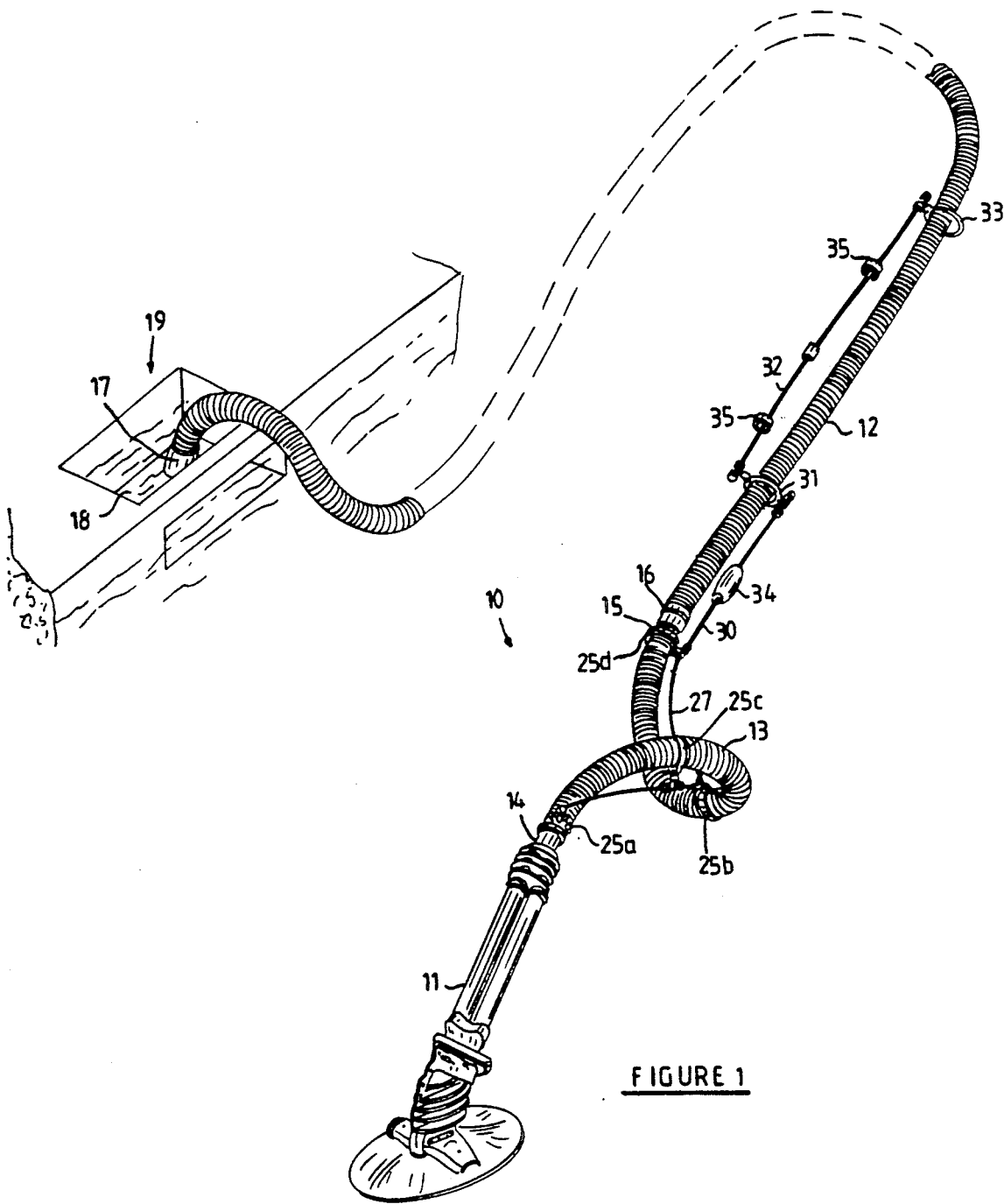
FIG. 1 is a perspective view of a submerged pool cleaner embodying the invention.

With reference to FIGS. 1 and 2a a submerged swimming pool cleaner 10 comprises a conventional suction head 11, a conventional length of suction pipe 12 and a shapable portion 13 of suction pipe (hereinafter referred to as the twist pipe 13) fitted between the suction head 11 and the conventional suction pipe 12. The twist pipe 13 has a spigot 14 at one end for connection to the suction head 11 and a like spigot 15 at its opposite end for connection to a complementary fitting 16 on the conventional pipe 12. A spigot 17 is provided at the remote end of the conventional pipe 12 for connection to a suction source which in this embodiment of the invention is a conventional baffle plate 18 in the weir 19 of a swimming pool. The weir 19 leads in conventional means to a swimming pool pump (not shown).

The twist pipe 13 is characterized in that it is shaped into a substantially helical-like form.

With further reference to FIG. 2a, the twist pipe 13 comprises a length of suction pipe fitted with clamps 25 spaced along its length. The clamps 25, which are numbered 25a, 25b, 25c and 25d, may be of any suitable kind and in this embodiment of the invention they are conventional hose clamps tightened with bolts and nuts (not shown).

Each clamp 25 has one or more ringlets 26 through which a thin elongate, flexible steel rod 27 passes. The clamps 25 are rotated consecutively to a pre-determined extent from one end of the pipe to the other so that the ringlets 26 lie in a helical path and hence the twist pipe 13 curls around the rod 27. For example, each clamp 25 may be rotated through 90° or more relative to a preceding clamp. The rod 27, being flexible, itself does not remain straight when thus fitted to the pipe 13 as shown in FIG. 2a.

At each end of the rod 27 a removable stop member 28 which is affixed with a grub screw 29, is provided which traps the rod 27 between the clamps 25a and 25d at opposite ends of the pipe. By using different lengths of the rod 27, the extent to which the pipe 13 curls around the rod 27, that is to say, the severity of the helical-like form of the pipe, may be altered.

Stop members 28 may also be provided on the rod 27 where it passes through the ringlets on the clamps 25b and 25c, as shown in FIG. 2b.

The severity of the helical-like form of the twist pipe 13 is important since it affects the motion of the suction head 11. Generally, the more curled the twist pipe 13, the more it tends to interfere with the movement of the suction head, the more random is the movement of the suction head and the less likely is the suction head to lodge itself in a corner or on a step of a swimming pool.

The twist pipe 13 is constructed from a length of conventional suction pipe which itself has a wall with a helical construction. The clamps 25 provided along the length of the twist pipe 13 can either be consecutively rotated in the direction of the helical construction of the pipe, or against it. In this regard, the Applicant has found that where the clamps 25 are rotated in one way relative to the helical construction of the pipe the twist pipe tends to function differently compared to an arrangement where the clamps 25 are rotated in the other way.

The spigots 14, 15 at the ends of the twist pipe 13 enable it to be fitted in opposite ways between the suction head 11 and the conventional suction pipe 12. In this regard, the Applicant has further found that the twist pipe 13 tends to function differently when it is fitted in one way rather than the other.

In the arrangement illustrated in FIGS. 1 and 2a, an additional length of rod 30 is fixed to the rod 27 and is connected through ringlets to a ring 31, which is located on the conventional pipe 12 and fits loosely thereon. The rods 27, 30 may conveniently be joined by screwably engaging a threaded ferrule 61 from opposite ends, as shown in FIG. 2d. The ferrule may also serve the function of a stop member 28. From the ring 31 a further length of rod 32 similarly extends a further distance along the conventional pipe 12 and similarly terminates in a second loose fitting ring 33. This arrangement has been found further to improve the randomness of the movement of the suction head and to prevent it from lodging in a corner or on the steps of the pool. The ring 31 may be done away with if the rod 30 is formed in a ring-like shape 60 as shown in FIG. 2a. The ring 33 may be similarly formed.

With the use of the additional lengths of rod 30 and 32 the pipe 12 may become too weighted and if required a float 34 may be fitted thereon to provide buoyancy.

If, on the other hand the pipe 12 does not become too weighted, weights 35 may be attached to the additional length of rod 32, or elsewhere, which can move freely along the rod with movement thereof and which further tend to enhance the operation of the suction head.

Instead of passing through ringlets 26, the rod 27 may pass through an eyelet 36 on a clamp 25, as shown in FIG. 2f. On its underside the eyelet may have downwardly directed flanges 37 which bite into the twist pipe 13 when the clamp is tightened and which prevent it from shifting out of position on the twist pipe.

Figure 2:
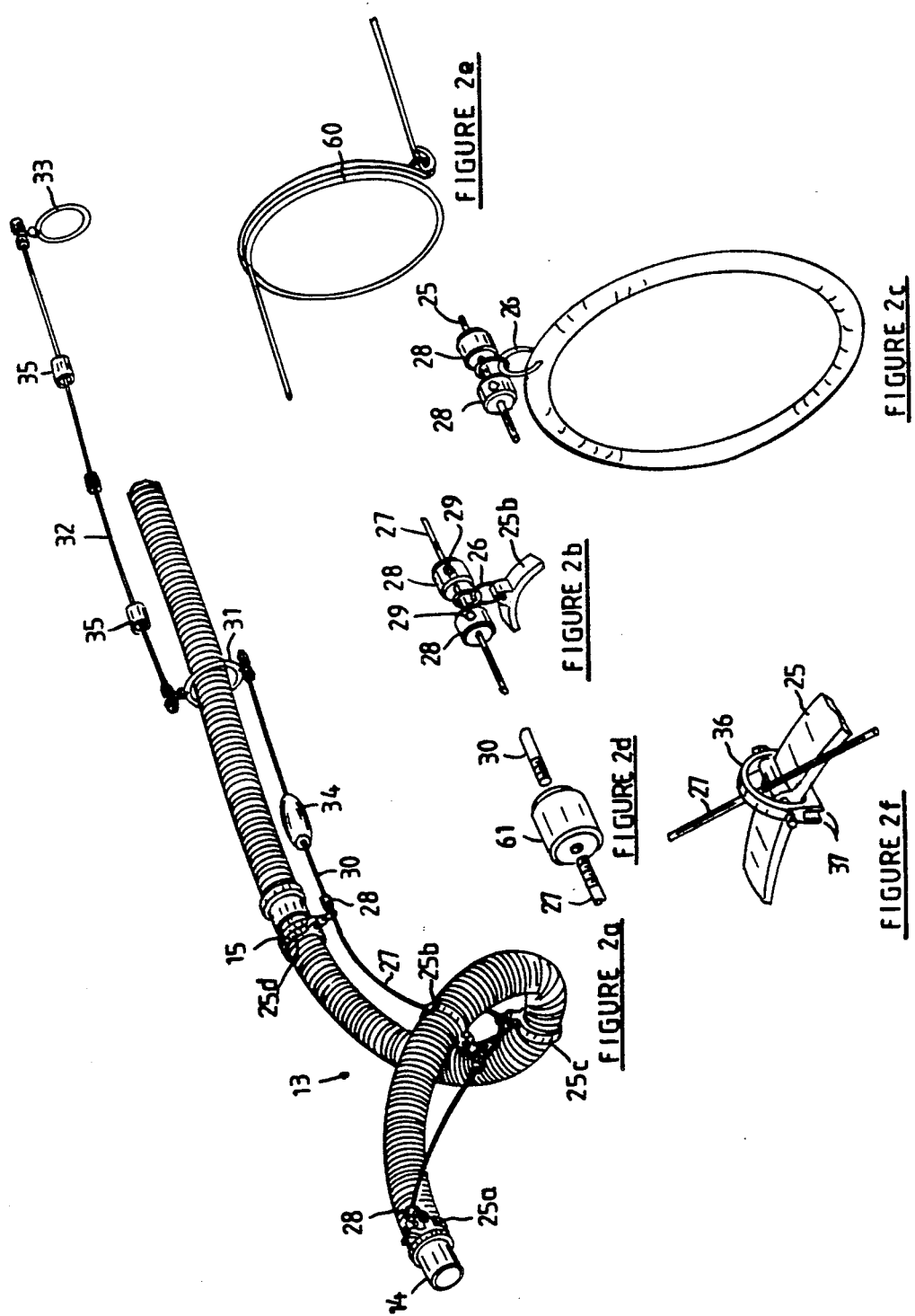
Figure 3:
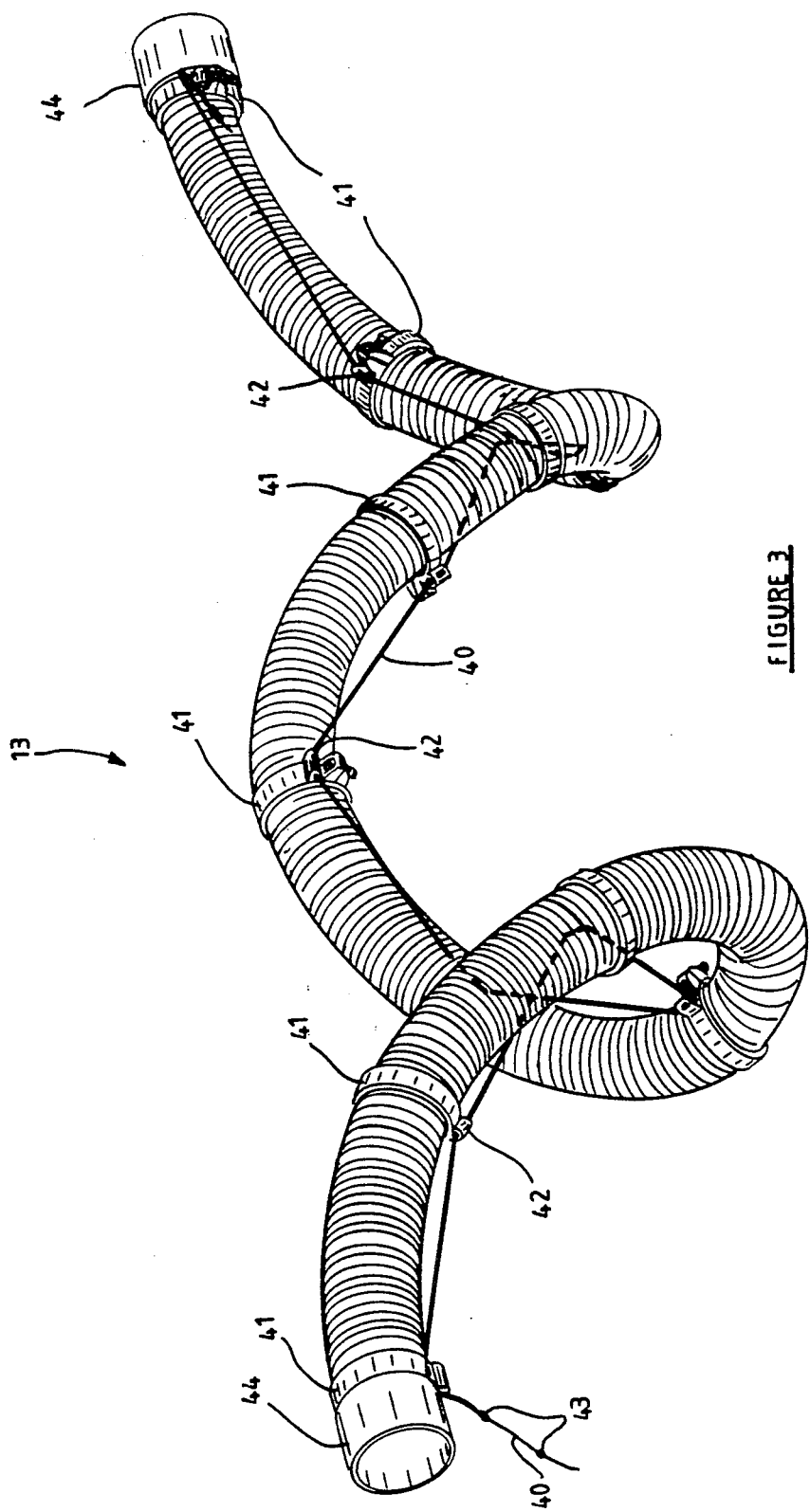
FIG. 3 is a similar view of an alternative construction of the shapable section of the suction pipe.

In the embodiment of the invention illustrated in FIG. 3, the elongated rod 27 is replaced with a tensioning member 40 made of high tensile wire. The clamps 25 of FIG. 2 are replaced by adjustable clamps 41 which have apertured lugs 42. The tensioning member 40, which is anchored to a clamp 41 at one end of the twist pipe 13, is threaded through the lugs 42 on the remainder of the clamps 41 and is thereupon pulled taut so that the pipe 13 curls into a substantially helical-like shape. It is then anchored to a clamp 41 at the other end of the pipe 13. The tensioning member is preferably adjustably anchored to at least one of the clamps 41 at the ends of the pipe 13. This is achieved by providing the clamps with split lugs 42 and providing a number of ferrules 43 crimped on to the tensioning member. The tensioning member may therefore be slipped into the split eyelet with one of the ferrules 43 trapped behind the eyelet. To decrease the tension on the tensioning member, a ferrule 43 nearer the end of the tensioning member is allowed to anchor against the split eyelet and the procedure is reversed to increase the tension in the tensioning member.

In the embodiment of the invention shown in FIG. 3 the spigots 14, 15 of FIG. 2a are replaced by sockets 44, if that is found to be more convenient for connecting the twist pipe to the suction head 11 and to the conventional pipe 12.

It will be understood that many modifications or variations of the invention may be possible to form the twist pipe into a helical form. For example, it may be desirable to locate the flexible tensioning member 40 inside the length of the twist pipe 13. Alternatively, a helical steel ribbon or pre-formed helical plastic casing may be attached along the exterior of the pipe to provide a twisted helical-like shape to the pipe.

In an alternative form, it is considered that the pipe 13 may be permanently shaped into a helical-like shape without having means for adjusting its shape. Such a pipe is shown in FIG. 4 which may, for example, be formed into its helical shape by means of a suitable moulding process.

In another arrangement a short elbow 54 such as the one shown in FIG. 4b may be used to connect the twist pipe 13 to the suction head 11. The elbow 54 has been found to have a considerable effect on the extent to which the twist pipe 13 interferes with the movement of the suction head. In this regard, the rotational position of the twist pipe 13 on the elbow 54 also makes a difference. Thus, if the twist pipe 13 does not function well to prevent lodgement of the cleaning head in a corner or on a step of the pool, or if the cleaning head does not move sufficiently randomly, it has been found that this can be changed merely by shifting the rotational position of the spigot 14 on the elbow 54. For this purpose, to give guidance to a user, a marking 55 may be applied to the elbow 54 and similar markings 56 may be applied to the spigots 14. A user therefore simply has to test by trial and error which relative positions of the spigot 14 and elbow 54 best suit the swimming pool in question.

Generally, the best results have been obtained where the conventional suction pipe 12 includes within its length a conventional swivel fitting 58 such as the one shown in FIG. 4c, which enables opposed parts of the pipe connected to the fitting freely to swivel with respect to one another. The use of such a fitting enables the twist pipe 13 to rotate and not to become unduly twisted and generally improves the functioning of the suction head.

Many other embodiments of the invention may be made without departing from the scope of the invention defined in the appended claims.

I claim:

1. A suction pipe for a suction-type submerged pool cleaner, the suction pipe linking a suction source of the pool cleaner to a suction head, said suction pipe comprising:
   a first section having means for connecting to the suction source, and
   a second section having means for connecting to the suction head, and
   means for shaping said second section into a substantially helical shape, wherein said shaping means comprises three clamps attached at intervals along a length of said second section of said suction pipe, each of said clamps having an eyelet suitable to receive an elongate member, wherein each said clamp is rotated through at least 90° relative to a preceding adjacent clamp so that the eyelets lie in a helical path, said elongate member being held attached to the length of the pipe at opposite ends thereof.

2. A suction pipe as claimed in claim 1 wherein the elongate member is a flexible steel rod.

3. A suction pipe as claimed in claim 1 wherein the elongate member is a flexible member which is drawn taut to shape the second section into a substantially helical shape.

* * * * *